US00RE36366E

United States Patent [19]

Suk

[11] E Patent Number: Re. 36,366

[45] Reissued Date of Patent: Nov. 2, 1999

[54] DETACHABLE GOLF BAG LEG STAND

[76] Inventor: Young J. Suk, 32 Garvies Point Rd., Glen Cove, N.Y. 11542

[21] Appl. No.: 09/035,127

[22] Filed: Mar. 5, 1998

Related U.S. Patent Documents

Reissue of:

[64] Patent No.: 5,607,128
Issued: Mar. 4, 1997
Appl. No.: 08/462,192
Filed: Jun. 5, 1995

[51] Int. Cl.[6] ..... A63B 55/00

[52] U.S. Cl. ..... 248/96; 206/315.7

[58] Field of Search ..... 248/96, 688, 297.21, 248/188; 206/315.3, 315.7

[56] References Cited

U.S. PATENT DOCUMENTS

| | | | |
|---|---|---|---|
| 4,739,958 | 4/1988 | Sato | 248/96 |
| 5,154,377 | 10/1992 | Suk | 248/96 |
| 5,415,285 | 5/1995 | Reimers | 248/96 X |
| 5,464,180 | 11/1995 | Cheng | 248/96 |
| 5,597,144 | 1/1997 | Lee | 248/96 |

*Primary Examiner*—Ramon O Ramirez
*Attorney, Agent, or Firm*—Myron Amer PC

[57] ABSTRACT

A golf bag-supporting leg mechanism having a slide repositioned from an upper to a lower position preparatory to operating the leg mechanism in which this operating mode is used to advantage in making the leg mechanism readily attachable and detachable from the golf bag. The slide positions, whether upper or lower, are established positions at which the slide is held against inadvertent sliding movement. The slide is thus effectively used as a hand grip to move the leg mechanism in relation to holding springs incident to being latched to and unlatched from the golf bag.

2 Claims, 3 Drawing Sheets

DETACHABLE GOLF BAG LEG STAND

Matter enclosed in heavy brackets [ ] appears in the original patent but forms no part of this reissue specification; matter printed in italics indicates the additions made by reissue.

The present invention relates generally to improvements for a golf bag leg stand wherein, more particularly, the improvements facilitate the removal from the golf bag of the leg mechanism or stand which typically would occur preparatory to the golfer using a motorized golf cart or pull golf cart, and thus not requiring use of the leg mechanism.

EXAMPLE OF THE PRIOR ART

Leg mechanisms for golf bags, as exemplified by my U.S. Pat. No. 5,154,377 issued on Oct. 13, 1992 for Golf Bag Stand, are attached, by rivets, to the golf bag, and thus not removed from the golf bag, even when not used, as when the golf bag is being transported on a motorized golf cart or on a pull golf cart. The strap which typically holds the golf bag in place on the motorized golf cart could damage the leg mechanism, and thus the removal thereof is desirable.

A readily removable and attachable leg mechanism is also desirable to provide the golfer with an option of either walking or riding during play, the former contemplating attaching a removed leg mechanism to the golf bag, and the latter dispensing with the attachment. Such an option is not provided with a "permanently" attached golf bag leg mechanism.

Broadly, it is an object of the present invention to provide an improved golf bag leg mechanism or stand overcoming the foregoing and other shortcomings of the prior art.

More particularly, it is an object to readily latch and unlatch the leg mechanism, using spring urgency, to the golf bag, using to advantage aspects of the operating mode of the leg mechanism, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 2:
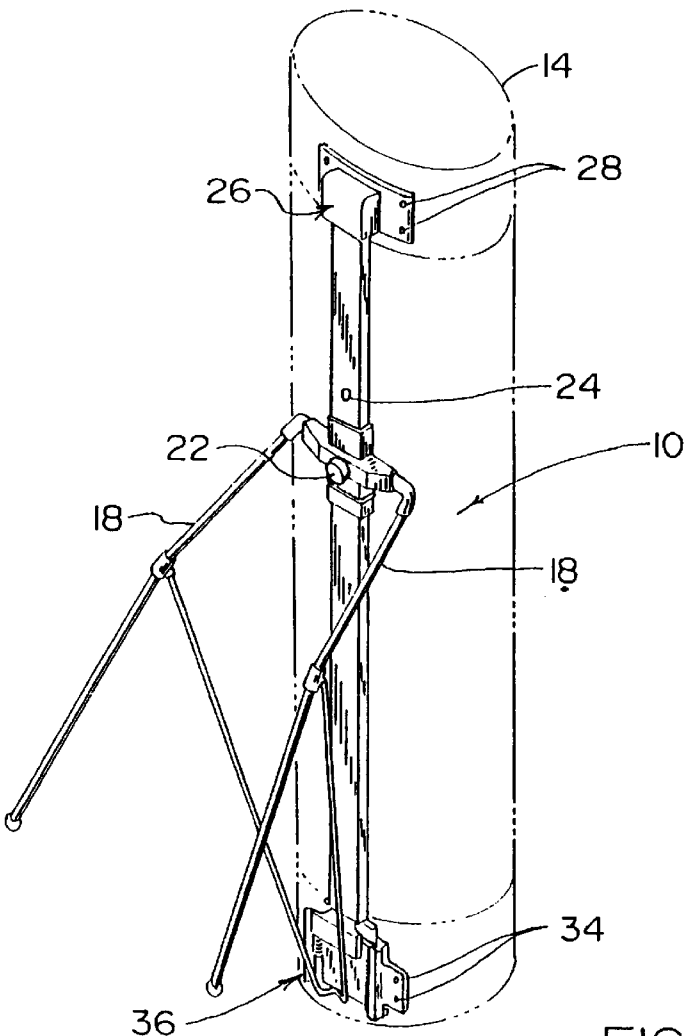
FIG. 2 is a view similar to FIG. 1, but illustrating the leg mechanism in an open-bag-supporting condition.
Figure 1:
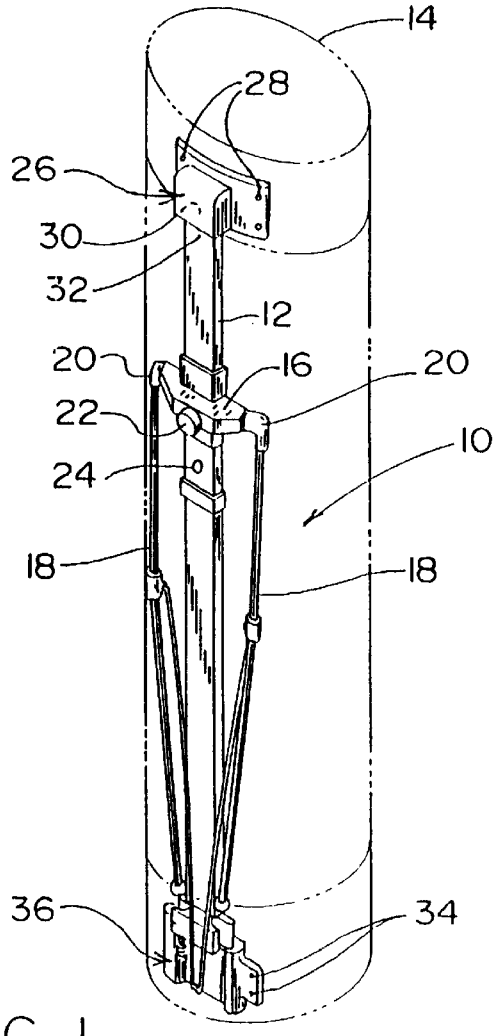
FIG. 1 is a perspective view with an attached leg mechanism in a closed condition.
Figure 3:
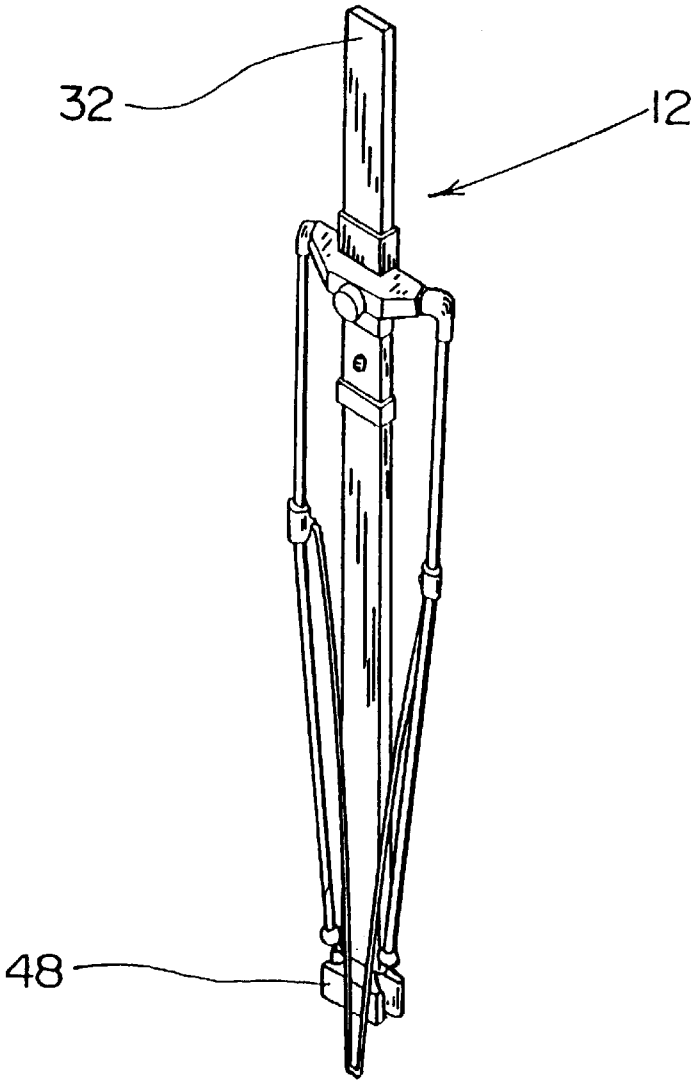
FIG. 3 is an isolated perspective view of the closed leg mechanism.
Figure 5:
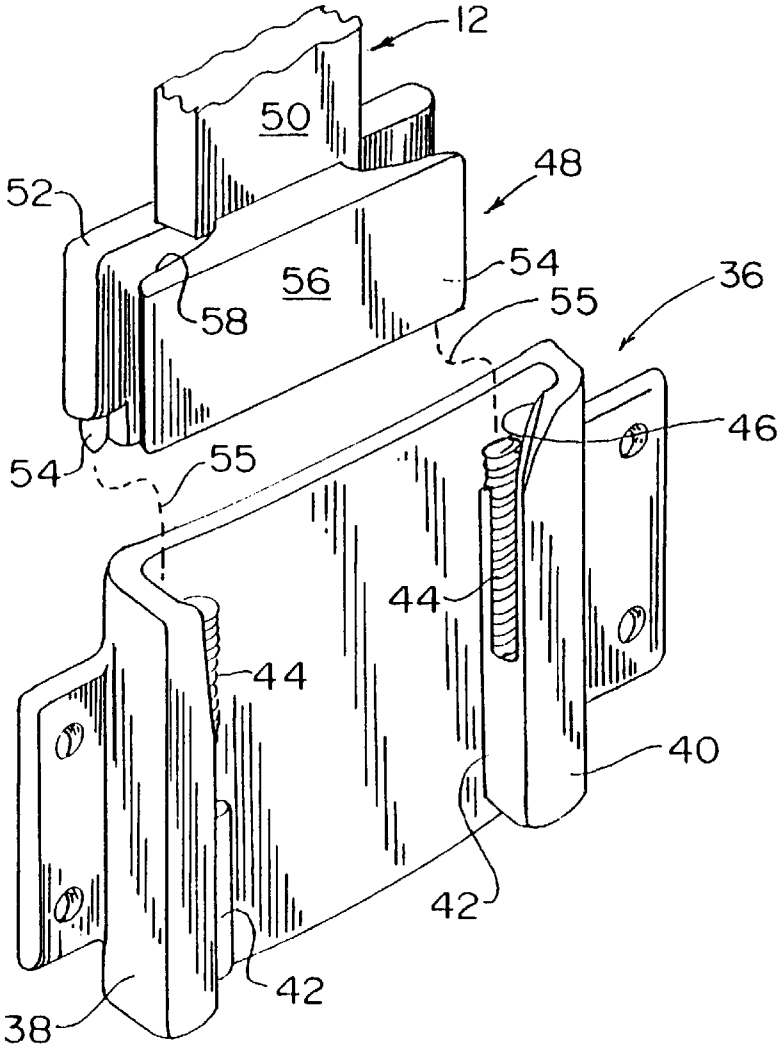
FIG. 5 is a view similar in perspective and scale to FIG. 4, but of a bracket for mounting the bottom of the leg mechanism to the golf bag.

As known, and as exemplified by U.S. Pat. No. 5,154,377 issued on Oct. 13, 1992 for Golf Bag Stand, incorporated herein in its entirety by this reference, are leg mechanisms, generally designated 10, of a type having a slide track 12 herein oriented lengthwise of the mechanism 10 and which slide track when in use is correspondingly oriented lengthwise of a golf bag 14. Cooperating with the slide track 12 is a slide 16 having positions of sliding movement therealong which in a known manner cause opposite legs 18 pivotally mounted, as at 20, on the slide 16 to articulate in pivotal traverses between a closed position, as shown in FIG. 1, into an open bag-supporting position, as shown in FIG. 2 and, of course, in reverse directions from open to closed positions.

The present invention relates to facilitated removal of the leg mechanism 10 from its operative position on the golf bag 14 which typically would occur preparatory to the golfer using a motorized golf cart or pull cart, and thus not requiring use of the leg mechanism 10. To this end, underlying the present invention is the recognition that to hold the slide 16 in an upper position of movement on the slide track 12, as per FIG. 1, and in a lower position of movement therealong, as per FIG. 2, there is used for this aspect of their operating mode cooperating interfitting male and female connecting means 22 and 24 respectively and, as is more pertinent to the within invention, in the upper position of FIG. 1 the slide 16 via the interconnection 22, 24 to the slide track 12 is thus unavoidably no longer slidable therealong. Consequently the held-in-place slide 16 advantageously serves as a handgrip for positioning and/or manually handling the slide track 12, and, more specifically, in urging the slide track 12 in movement for mounting/latching and unmounting/unlatching the leg mechanism 10 from the golf bag 10, as will now be described.

Figure 4:
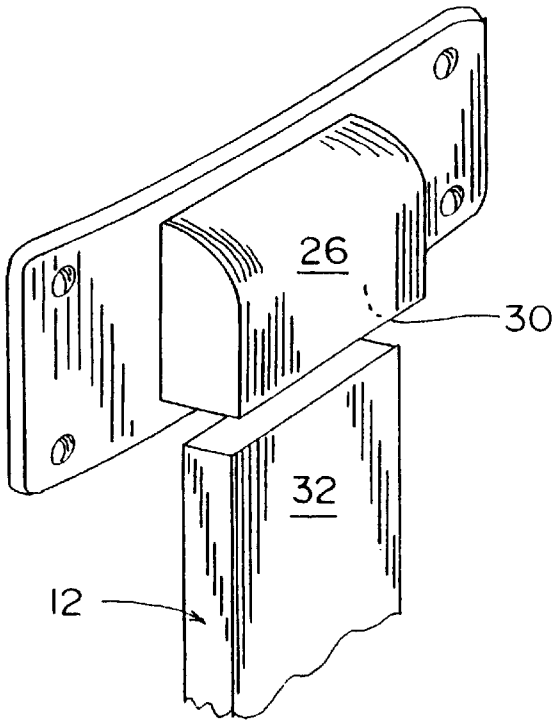
FIG. 4 is a partial perspective view, on an enlarged scale, of a bracket for mounting the top of the leg mechanism to the golf bag.

In the attachment of the leg mechanism 10 to the golf bag 14 there is provided a top bracket 26, riveted at 28, bounding a compartment 30 sized and shaped to receive in projected relation therein the top 32 of the slide track 12. In an aligned position with the top bracket 26 there is riveted, at 34, a bottom bracket 36 having a forwardly extending side wall 38 and an opposite C-shaped in cross-section side wall 40, each said walls having bases 42 for seating helical springs 44, in any appropriate manner. Sized and shaped to be projected into the compartment 46 bounded by the C-shaped wall 40 is a depending configuration, generally designated 48, on the bottom end 50 of the slide track 12 which includes a rear panel 52 with opposite guides 54 that register, as denoted at 55, with the springs 44 when seated in the compartment 46, and a front panel 56 mounted with a clearance 58 so as to serve as a compartment closure. The length of the springs 44 is selected to permit their compression which allows an extent of descending movement in the slide track 12 to correspondingly allow the top 32 of the slide track 12 to assume a position below the top bracket 26, as depicted in FIG. 4, and movement of the slide track top 32 into the bracket compartment 30. When the handgrip 16 is released, the urgency in the springs 44 seats the slide track top 32 fully into the compartment 30 and thus the leg mechanism 10 is held or latched in spanning relation between the brackets 26 and 36 under spring urgency. To unlatch the leg mechanism 10 incident to removal from the golf bag 14, the procedure is reversed, i.e., the user presses down on the handgrip 16 in its upper FIG. 2 position, and clears the exposed slide track top 32 from the top bracket.

It should be understood that the position of the brackets 26 and 36 on the golf bag 14, at the option of the user, can be reversed, but in practice the springs 44 in the bottom bracket 36 is preferable in that pressing down rather than pulling up seems to be easier in compressing the springs.

While the apparatus herein shown and disclosed in detail in fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a removable leg mechanism for a golf bag of a type having a slide track adapted to be mounted lengthwise of said golf bag and a slide of said leg mechanism having legs operatively mounted thereon for articulating movement between an open bag-supporting position and a closed storage position and which in said slide and said slide track are cooperating interfitting respective male and female connecting means related to said leg open and closed positions unavoidably effective in joining said slide to said slide track, said improvements comprising a cooperating spaced pair of slide track-engaging members mounted adjacent opposite ends of said golf bag for projecting thereinto said opposite ends of said slide track incident to mounting said slide track with said slide disposed in sliding relation therealong on said golf bag, and a compression spring disposed in a selected one said slide track-engaging member effective to hold said mounted slide track under spring urgency in spanning relation between said slide track-engaging members, whereby in said joined condition of said slide to said slide track resulting from said interconnection of one said male and female connecting means said slide serves as a convenient handgrip for urging said one end of said slide track in movement compressing said compression spring and correspondingly unmounting said opposite end of said slide track from said slide track-engaging member to thereby facilitate removal of said leg mechanism from said golf bag.

*2. Improvements for a removable leg mechanism for a golf bag of a type having a vertically oriented leg mechanism support and a transverse horizontally oriented leg-opening component fixedly attached thereto, said improvements comprising a cooperating spaced pair of vertically oriented leg mechanism support-engaging members mounted at adjacent opposite ends of said golf bag for protecting thereinto opposite ends of said vertically oriented leg mechanism support so as to mount said vertically oriented leg mechanism on said golf bag with said horizontally oriented leg-opening component fixedly attached thereto, and a compression spring disposed in a selected one said vertically oriented leg mechanism support-engaging members effective to hold said vertically oriented leg mechanism support under spring urgency in spanning relation between said vertically oriented leg mechanism support-engaging members, whereby said horizontally oriented leg-opening component serves as a convenient hand grip for urging said one of said vertically oriented leg mechanism support in movement compressing said compression spring and correspondingly unmounting said opposite end thereof to thereby facilitate removal of said leg mechanism from said golf bag.*

* * * * *